(12) United States Patent
Darby

(10) Patent No.: US 6,954,791 B2
(45) Date of Patent: Oct. 11, 2005

(54) TIME-BASED NETWORK CONNECTIONS

(75) Inventor: Daylan B. Darby, West Jordan, UT (US)

(73) Assignee: Intel Corporation, Santa Clara, CA (US)

( * ) Notice: Subject to any disclaimer, the term of this patent is extended or adjusted under 35 U.S.C. 154(b) by 609 days.

(21) Appl. No.: 09/768,746

(22) Filed: Jan. 23, 2001

(65) Prior Publication Data

US 2002/0099828 A1 Jul. 25, 2002

(51) Int. Cl.[7] .............................................. G06F 15/16
(52) U.S. Cl. ...................................... 709/227; 709/228
(58) Field of Search ................................ 709/227–228, 709/203, 217–219

(56) References Cited

U.S. PATENT DOCUMENTS 6,124,949 A * 9/2000 West et al. ................. 358/434
6,351,773 B1 * 2/2002 Fijolek et al. .............. 709/228

OTHER PUBLICATIONS

Raymond, E.S., et al., "fetchmail (1)", http://web.archive.org/web/20000903061823/http://tuxedo.org/~esr/fetchmail/fetchmail-man.html, dated Sep. 3, 2000, pp. 1–41.*

The Fetchmail FAQ, http://tuxedo.org/~esr/fetchmail/fetchmail-FAQ.html, dated Sep. 7, 2000, accessed on Sep. 15, 2000, pp. 1–41.

Fetchmail (1), http://tuxedo.org/~esr/fetchmail/fetchmail-man.html, dated Sep. 15, 2000, pp. 2–38.

"DHCP Server" [retrieved on Mar. 18, 2005] retrieved from the Internet: <URL: http://www.j51.com/~sshay/tcpip/dhcp.dhcp.//htm.

R Droms, "Dynamic Host Configuration Protocol", Bucknell University, Network Working Group, Mar. 1997 [retrieved on Mar. 18, 2005], retrieved from the Internet: <URL: http://www.ietf.org/rfc/rfc2131.txt.

* cited by examiner

Primary Examiner—Frantz B. Jean
(74) Attorney, Agent, or Firm—Fish & Richardson P.C.

(57) ABSTRACT

Making time-based network connections includes causing a first device to establish a connection with a second device, enabling a data transaction between the first device and the second device, determining if a time-related event has occurred since establishing the connection between the first device and the second device, terminating the connection between the first device and the second device at a time based on the occurrence of the time-related event, and reestablishing a connection between the first device and the second device, enabling another data transaction.

34 Claims, 2 Drawing Sheets

TIME-BASED NETWORK CONNECTIONS

BACKGROUND

This invention relates to time-based network connections.

A communication protocol generally defines a format for providing end-to-end service (e.g., data delivery) between two end-points connected to a network (e.g., a public network such as the Internet or a private network such as a local intranet), usually independent of the characteristics of the particular network. Some protocols, such as transmission control protocol (TCP) and user datagram protocol (UDP), typically do not complete transactions between the two end-points until a network connection between the two end-points is properly terminated. If the network connection is lost or otherwise ends improperly, then during the next network connection between the two end-points, the transactions may be repeated.

DESCRIPTION

Figure 1:
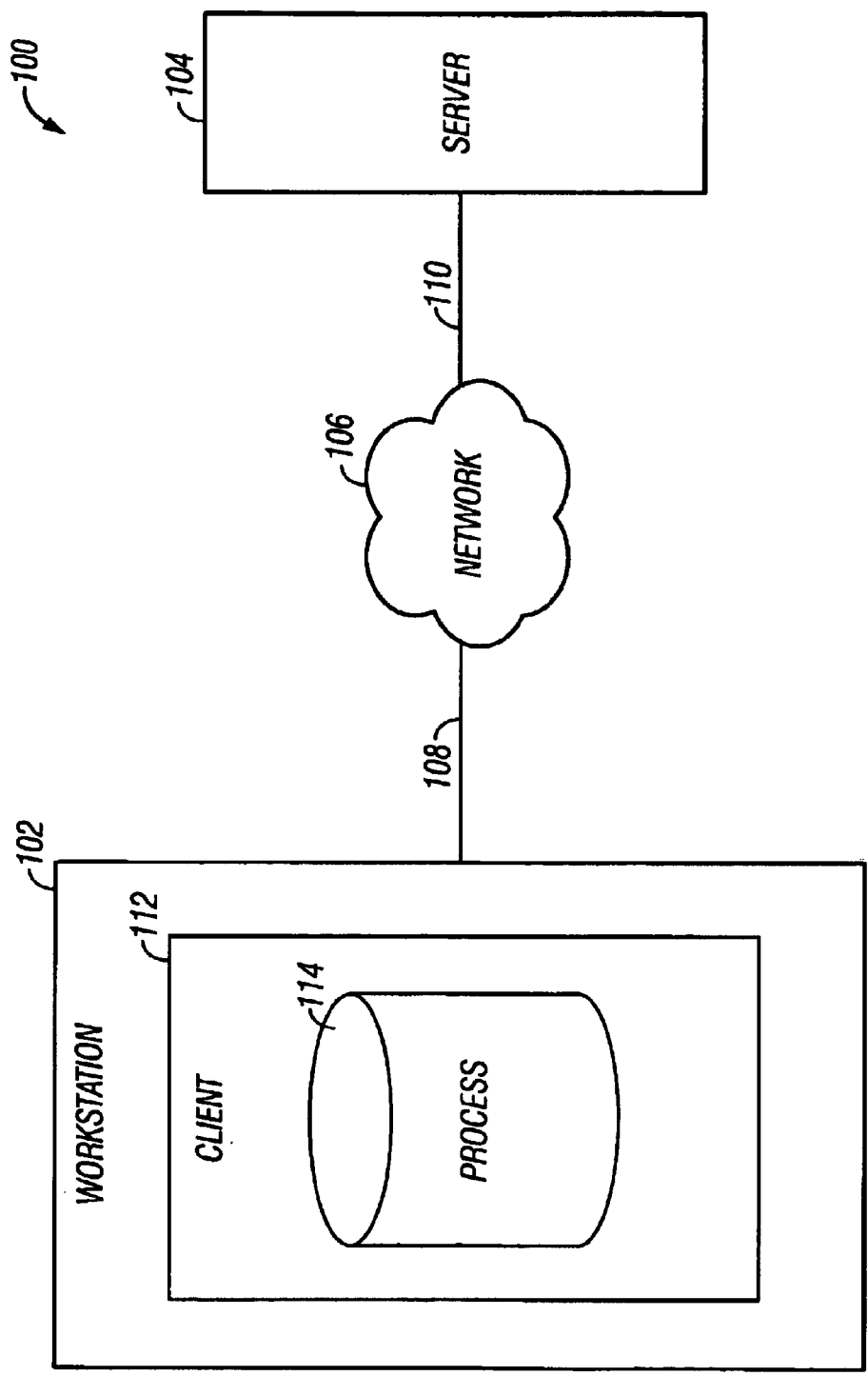
FIG. 1 shows a simplified network configuration.

Referring to FIG. 1, a network configuration 100 includes a workstation 102 that can communicate with a server 104 across a network 106 using communication links 108 and 110. When a client 112 included in the workstation 102 establishes a connection with the server 104, a process 114 included in the client 112 sets a timer, tracking the duration of the connection. After the client 112 completes a transaction with the server 104, the process 114 determines if a certain amount of time has elapsed as indicated by the timer. If the certain amount of time has not elapsed, the client 112 and the server 104 remain connected and can continue communicating. If the amount of time has elapsed, the process 114 triggers the termination of the connection between the client 112 and the server 104. The client 112 can then immediately attempt to establish another connection with the server 104.

Terminating the connection between the client 112 and the server 104 after a certain amount of time reduces the risk of unexpected connection loss between the client 112 and the server 104 as compared to a connection of unlimited duration or to a connection limited by other criteria such as number of allowable transactions per connection session. (Other criteria may be used in addition to the time-based criteria.) Terminating the connection also enables the server 104 to perform any procedures it normally performs upon termination of a connection, such as committing (completing) the transaction with the client 112, thereby reducing the chances of the server 104 later duplicating the transaction with the client 112 should the connection unexpectedly terminate. These procedures on the server 104 are typically governed by the protocol(s) implemented by the server 104, e.g., transport protocols such as TCP, UDP, and Internet Protocol (IP), electronic mail (email) protocols, and other similar types of protocols.

Figure 2:
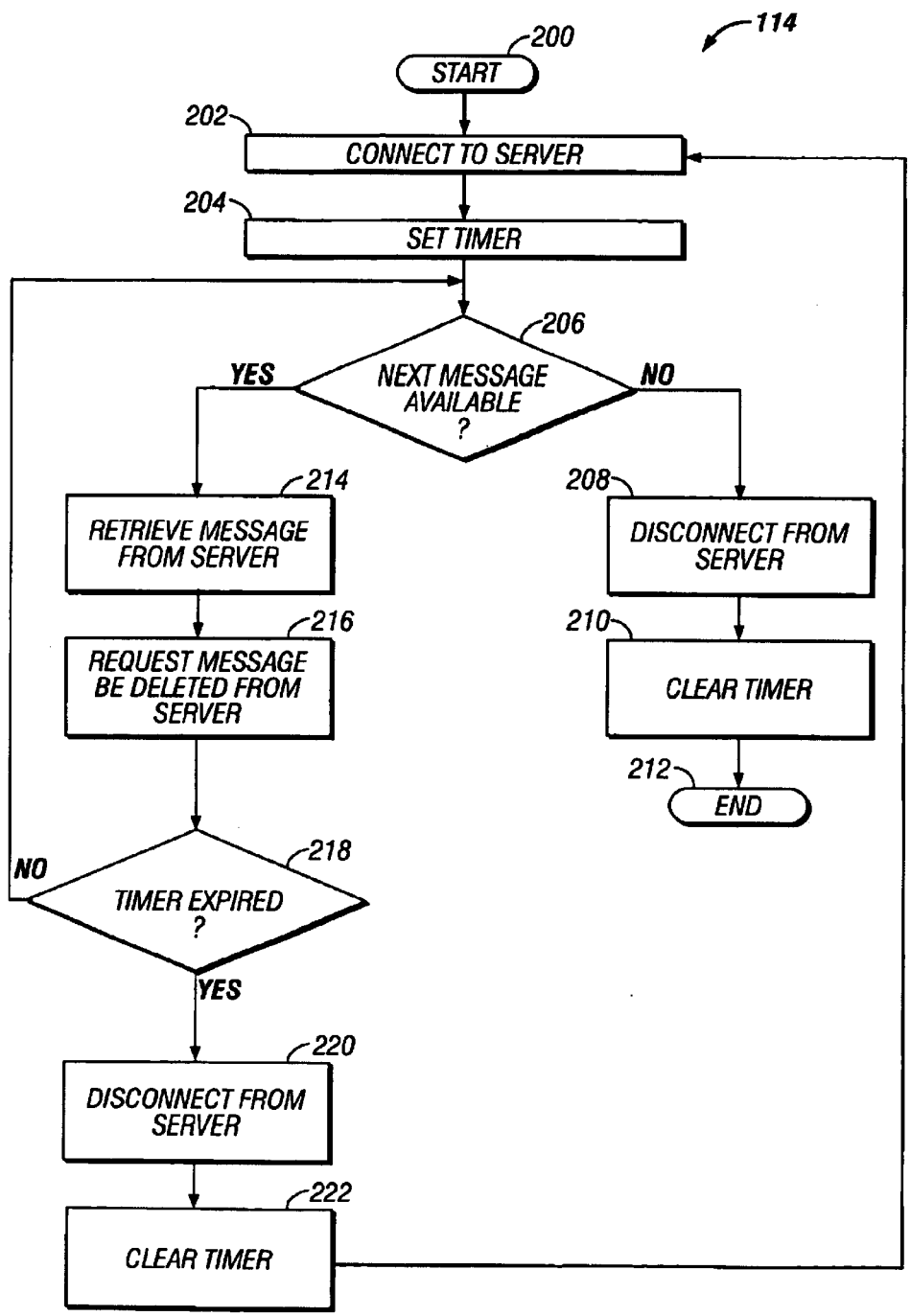
FIG. 2 is a flowchart showing a process of connecting to a server.

For example, referring to FIG. 2, the process 114 begins 200 when the workstation 102 connects 202 to the server 104. The workstation 102 that includes the client 112 can include any device capable of running the client 112 and connecting to the network 106, such as a mobile computer, a stationary computer, a server, a personal digital assistant, a telephone, a pager, or other similar device. The network 106 can include any kind and any combination of networks such as the Internet, a local network, a private network, a public network, or other similar network. The client 112 includes one or more programs that enable a user of the workstation 102 to interact with the workstation 102. The server 104 can include any device capable of connecting to the network 106 and storing data. The communication links 108 and 110 between the workstation 102 and the server 104 can be any kind and any combination of communication links such as modem links, cables, point-to-point links, infrared connections, fiber optic links, cellular links, Bluetooth, satellite links, or other similar links. The workstation 102 and the server 104 may be remotely located from each other, capable of communicating only across the network 106 using the communication links 108 and 110. (The network configuration 100 is simplified for ease of explanation; the network configuration 100 may include additional elements such as additional networks, proxy servers, firewalls or other security mechanisms, Internet Service Providers (ISPs), and other elements.)

The process 114 can be included as part of the client 112 as shown, be otherwise included on the workstation 102 (e.g., as a stand-alone application or as part of another application), or be otherwise accessible to the workstation 102 (e.g., be included on a network accessible by the workstation 102 and/or the client 112 or be part of a network stack that the workstation 102 uses to communicate with the network 106 such as a TCP/IP protocol stack).

The client 112 could include an electronic mail (email) application that enables the user to send and receive email messages across the network 106 using the server 104 as a "host," the location that hosts (stores) the user's incoming email messages at least until the user retrieves the email messages. Examples of email applications in a UNIX context include elm and pine. The client 112 can run in any operating system environment, such as UNIX, Linux, Windows, and other similar operating systems. The server 104 and/or the client 112 may be capable of implementing any version of Post Office Protocol (POP), Internet Message Access Protocol (IMAP), Application Configuration Access Protocol (ACAP), Simple Mail Transfer Protocol (SMTP), extended SMTP (ESMTP), or other similar protocol. POP, IMAP, ACAP, SMTP, and ESMTP are protocols that the server 104 and/or the client 112 may use to process, send, and/or receive email messages. Examples of transactions that the server 104 may not complete until the connection is properly terminated include deleting files, designating files for deletion, moving files, sending files, and other similar operations.

Once the workstation 102 connects to the server 104, typically through the client 112, the process 114 sets 204 a timer. The workstation 102 or the client 112 may notify the process 114 that a connection has been established with the server 104, or the process 114 may be configured to detect when a connection has been established (e.g., by running as a daemon, continually monitoring for establishment of a connection). The timer may be set to zero (or other value) and count up, or it may be set with a predetermined value and count down. The predetermined value reflects an amount of time that the workstation 102 and the server 104 may remain connected before their connection should be terminated. The timer's set value may be based on ordinary time (hours, minutes, seconds, etc.) or on another counting system (clock ticks, etc.). In any event, once set, the timer begins counting up or down as appropriate to track the elapsed time of the present connection between the workstation 102 and the server 104.

Using the email application as the example transaction here, the client 112 asks 206 the server 104 (possibly through the process 114) whether the server 104 has an email message available for the user. If the server 104 has no available email messages, then the workstation 102 disconnects 208 from the server 104. The server 104 may not have any available messages because the user has no new email messages, the server 104 does not presently have access to stored email messages, or other similar reason. When the connection between the workstation 102 and the server 104 is terminated, the process 114 may clear 210 the timer. In that case, the process 114 may reset the timer and need not set the timer as described above when (or if) the workstation 102 establishes a new connection with the server 104; the process 114 need only start the timer counting up or down as appropriate.

The connection between the workstation 102 and the server 104 may automatically terminate if no email messages are available, or the user may be given the option to remain connected. If the user chooses to remain connected, then the timer may keep running or it may be cleared and reset. Once the workstation 102 disconnects from the server 104, the process 114 ends 212.

If the server 104 does have an available email message for the user, then the client 112 retrieves 214 the email message from the server 104. The client 112 retrieves the email message using any technique supported by the client 112 and the workstation 102, such as by downloading the email message across the network 106 over the communication links 108 and 110. After retrieving the email message, the client 112 requests 216 that the server 104 delete the email message. Alternatively, depending on the type of client and/or on the server's protocol, the client 112 may not need to separately request the deletion or to request the deletion at all.

The process 114 then determines 218 if the timer has expired. If the timer was counting down from a predetermined value, then the timer has expired if the timer value equals (or is less than) zero or other stop value. If the timer was counting up, then the timer has expired if the timer equals (or exceeds) a stop value. The stop value, like the predetermined value described above, reflects an amount of time that the workstation 102 and the server 104 may remain connected before their connection should be terminated.

If the timer has not expired, then the client 112 asks 206 the server 104 whether the server 104 has an email message available for the user as described above.

If the timer has expired, then the workstation 102 disconnects 220 from the server 104. As described above, when the connection between the workstation 102 and the server 104 is terminated, the process 114 may clear 222 the timer and reset the timer, thus meaning that the process 114 need not set the timer when (or if) the workstation 102 establishes a new connection with the server 104. Once terminated from the server 104, the workstation 102 may then automatically or manually connect 202 again to the server 104.

The reestablishment of a connection between the workstation 102 and the server 104 may be performed transparently to the user, thus reducing disruption to the user by not requiring repeated logging in to the client 112 and/or the server 104. The termination and subsequent establishment of a connection with the server 104 can be performed with little or no visual disruption or processing interruption to the user.

On the other hand, the process 114 may terminate the connection and provide notice to the user, such as by displaying a message box on the workstation's display screen indicating that the connection to the server 104 has been terminated. The user may be required to manually trigger a new connection to the server 104, such as by clicking on or selecting a button in the message box.

Once the workstation 102 is no longer connected to the server 104, depending on the protocol used, the process 114 may trigger the deletion of any mail retrieval code(s) used on the workstation-side in retrieving email messages from the server 104. The deletion of the code(s) can help maintain security on the workstation-side, preventing another user at the workstation 102 from using a previous user's mail retrieval code(s) to illicitly retrieve the previous user's email messages from the server 104.

Once the server 104 is no longer connected to the workstation 102, the server 104 can perform its usual post-connection procedures (if any). These post-connection procedures may include deleting the retrieved email message(s), perhaps in response to the client's request(s) to delete the retrieved email message(s). Thus, the server 104 can delete the email message(s) retrieved by the workstation 102 during the previous connection session, thereby reducing or eliminating the chances that the server 104 would mistakenly interpret the retrieved email messages as unretrieved (as may happen with improper or unexpected termination of the connection) and that the workstation 102 would download email messages it already retrieved from the server 104 (upon reestablishing connection with the server 104).

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, telephones, pagers, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language such as C to communicate with a machine system such as a computer system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the machine to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:

causing a first device to establish a connection with a second device, enabling data transactions between the first device and the second device;

determining, after completion of each of one or more data transactions between the first device and the second device, and before any data transactions other than the completed data transactions have begun between the first and second devices, if a time-related event has occurred since establishing the connection between the first device and the second device;

based on the occurrence of the time-related event, terminating the connection between the first device and the second device at a time after at least one of said one or more data transactions; and reestablishing a connection between the first device and the second device, enabling another data transaction.

2. The method of claim 1 in which the time-related event is lapsing of a threshold period of time.

3. The method of claim 2 further comprising setting a timer when the connection is established between the first device and the second device.

4. The method of claim 3 in which determining if the time-related event has occurred includes determining if the timer has clocked the threshold period of time since the connection was established between the first device and the second device.

5. The method of claim 1 in which said data transactions include determining if the second device has data available for transmission across a network to the first device and if data is available, transmitting the data to the first device.

6. The method of claim 5 further comprising, if data is not available, terminating the connection between the first device and the second device.

7. The method of claim 1 further comprising requesting that the second device complete said one or more data transactions before determining if the time-related event has occurred since establishing the connection between the first device and the second device.

8. The method of claim 7 in which requesting that the second device complete said one or more data transactions includes requesting that the second device delete data.

9. The method of claim 1 further comprising, if the time-related event has not occurred, determining if the second device has data available for transmission to the first device.

10. The method of claim 1 further comprising establishing a connection across a network between the first device and the second device.

11. An article comprising:

a machine-readable medium which stores machine-executable instructions, the instructions causing a machine to:

cause a first device to establish a connection with a second device, enabling data transactions with the second device;

determine, after completion of each of one or more data transactions between the first device and the second device, and before any data transactions other than the completed data transactions have begun between the first and second devices, if a time-related event has occurred since establishing the connection between the first device and the second device;

based on the occurrence of the time-related event, terminate the connection between the first device and the second device at a time after at least one of said one or more data transactions; and reestablish a connection between the first device and the second device, enabling another data transaction.

12. The article of claim 11 in which the time-related event is lapsing of a threshold period of time.

13. The article of claim 12 further causing a machine to set a timer when the connection is established between the first device and the second device.

14. The article of claim 13 in which determining if the time-related event has occurred includes determining if the timer has clocked the threshold period of time since the connection was established between the first device and the second device.

15. The article of claim 11 in which said data transactions include determining if the second device has data available for transmission across a network to the first device and if data is available, transmitting the data to the first device.

16. The article of claim 15 further causing a machine to, if data is not available, terminate the connection between the first device and the second device.

17. The article of claim 11 further causing a machine to request that the second device complete said one or more data transactions before determining if the time-related event has occurred since establishing the connection between the first device and the second device.

18. The article of claim 11 in which requesting that the second device complete said one or more data transactions includes requesting that the second device delete data.

19. The article of claim 11 further causing a machine to, if the time-related event has not occurred, determine if the second device has data available for transmission to the first device.

20. The article of claim 11 further causing a machine to establish a connection across a network between the first device and the second device.

21. An apparatus comprising:

a first device configured to connect to a network;

an application accessible by the first device and configured to communicate with a second device configured to connect to the network; and a mechanism accessible by the first device and configured to determine, after the first device completes each of one or more data-related transactions with the second device across the network, and before any data-related transactions other than the completed data-related transactions have begun between the first and second devices, if a time-related event has occurred since the first device established a connection with the second device and if so, trigger termination of the connection.

22. The apparatus of claim 21 in which the time-related event is lapsing of a threshold period of time.

23. The apparatus of claim 21 in which the mechanism is also configured to start a timer when the first device establishes a connection with the second device and to check the timer to determine if the time-related event has occurred since the first device established the connection with the second device.

24. The apparatus of claim 21 in which the mechanism is also configured to trigger establishment of a new connection between the first device and the second device after the connection is terminated.

25. A system comprising:

a server device configured to connect to a network and to store data;

a client device configured to connect to the network and to retrieve data stored at the server device; and a mechanism accessible by the client device and configured to determine, after the client device has retrieved data stored at the server device, and before the client device has begun retrieving data stored at the server device other than the retrieved data, if a time-related event has occurred since the client device established a connection with the server device and if so, trigger termination of the connection.

26. The system of claim 25 in which the data includes an electronic mail message.

27. The system of claim 25 in which the network includes the Internet.

28. The system of claim 25 further comprising a mechanism accessible by the server device and configured to, after the connection is terminated, delete the data retrieved by the client device.

29. The system of claim 25 in which the mechanism accessible by the client device is also configured to trigger establishment of a new connection between the client device and the server device after the connection is terminated.

30. A method comprising:
  causing a first device to establish a connection with a second device, enabling a transmission of an electronic mail message between the first device and the second device;
  determining, after the first device completes transmission of each of one or more electronic mail messages, and before transmissions of any electronic mail messages other than the electronic mail messages that have been transmitted between the first and second devices, if a time-related event has occurred since establishing the connection between the first device and the second device;
  terminating the connection between the first device and the second device at a time based on the occurrence of the time-related event; and
  reestablishing a connection between the first device and the second device, enabling another transmission of an electronic mail message.

31. An article comprising:
  a machine-readable medium which stores machine-executable instructions, the instructions causing a machine to:
    cause a first device to establish a connection with a second device, enabling transmission of an electronic mail message from the second device;
    determine, after the first device completes transmission of each of one or more electronic mail messages, and before transmissions of any electronic mail messages other than the electronic mail messages that have been transmitted between the first and second devices, if a time-related event has occurred since establishing the connection between the first device and the second device;
    terminate the connection between the first device and the second device at a time based on the occurrence of the time-related event; and
    reestablish a connection between the first device and the second device, enabling another transmission of an electronic mail message.

32. An apparatus comprising:
  a first device configured to connect to a network;
  an application accessible by the first device and configured to communicate with a second device configured to connect to the network; and
  a mechanism accessible by the first device and configured to determine, after the first device completes a transmission of an electronic mail message from the second device across the network, and before the first device begins transmission of an electronic mail message other than the transmitted electronic mail message from the second device across the network, if a time-related event has occurred since the first device established a connection with the second device and if so, trigger termination of the connection.

33. A system comprising:
  a server device configured to connect to a network and to store an electronic mail message;
  a client device configured to connect to the network and to retrieve the electronic mail message stored at the server device; and
  a mechanism accessible by the client device and configured to determine, after the client device has retrieved the electronic mail message stored at the server device, and before the client device begins transmission of an electronic mail message other than the electronic mail message that has been retrieved from the server device across the network, if a time-related event has occurred since the client device established a connection with the server device and if so, trigger termination of the connection.

34. The system of claim 33, wherein:
  the mechanism determines if the time-related event has occurred in response to the client device having retrieved the electronic mail message; and
  the client device is further configured to:
    if the mechanism determines the time-related event has not occurred, determine if another electronic mail message is available for retrieval; and
    if another electronic mail message is not available for retrieval, properly terminate the connection; otherwise, retrieve the electronic mail message.

* * * * *